ated Aug. 29, 1967

3,338,721
MERINGUE

Floyd D. Schoonover, New York, N.Y., assignor to Standard Brands Incorporated, New York, N.Y., a corporation of Delaware
No Drawing. Filed June 24, 1964, Ser. No. 377,467
3 Claims. (Cl. 99—139)

This invention relates to an improved meringue composition.

Meringues comprise a mixture of egg whites and a sugar which when beaten produce a light foam. The proportion of egg whites and sugar depend both on the taste of the consumer and the use to which the meringue is put. For example, meringues with relatively small proportions of sugar generally find application as toppings for pies or other baked goods and are classified as "soft meringues," while meringues with relatively large proportions of sugar generally find application as a foundation for, or as, a dessert and are classified as "hard meringues."

Soft meringues must be formulated with care and baked within a narrow temperature range or they will leak some of their aqueous fraction onto the top of the pastry filling thereby making it undesirably moist and, additionally, deleteriously affecting its cutting properties. The amount of sugar added varies with the fineness thereof; in general, desirable sweetness and texture may be obtained with two tablespoons of fine sucrose, or as much as three tablespoons of ultra-fine sucrose per white of one egg.

Hard meringues, because they contain a large proportion of sugar have a fairly smooth, somewhat crystalline, crisp crust as opposed to the soft meringues. The optimum proportion of sucrose is from four to five tablespoons per white of one egg, the smaller quantity being preferable.

Both hard and soft meringues may be produced by a variety of methods. The two most common methods are:

(1) A cold method in which egg whites and sugar are mixed and beaten at ambient temperature to a firm dry peak and, (2) A hot method wherein all or part of the sugar is dissolved in a small quantity of water and the resulting solution is boiled and then beaten into egg whites; if only part of the sugar is added as a solution, the remainder is incorporated into the egg whites before the sugar solution is added.

These methods may be employed with or without an edible thickener which functions as a stabilizer. The stabilizing material acts to absorb excess moisture of the meringue thereby helping to prevent leakage of its aqueous fraction. Thickeners commonly used for this purpose are, for example, starch, gelatin and vegetable gums such as sodium alginate.

After the preparation of a soft meringue by one of these methods, it is placed on and shaped around the surface of baked goods, for example, lemon pies, and baked for setting and to provide the desired texture and color. Generally, soft meringues are baked at a temperature from about 400 to 450° F. for about 8 to 12 minutes. If the meringue is baked at too high a temperature or for two long a period of time, it becomes tough and tacky, thus detracting from its eating qualities. Furthermore, the baked goods constituting the foundation may be adversely affected under these conditions.

Hard meringues are generally baked in the temperature range from about 250 to about 300° F. for about 30 to about 60 minutes in order to obtain the desirable golden brown crust and crispness. At higher baking temperatures, and/or at longer baking times, the meringue becomes tough, rubbery and gummy.

It is the object of the present invention to provide a meringue composition which can be baked at a lower temperature and/or in a shorter period of time than is required in the case of prior art meringues.

This object, as well as other objects, together with the advantages of this invention, will be readily comprehended by persons skilled in the art upon reference to the following description.

These objects are achieved, in accordance with the present invention, by incorporating into a meringue composition a small amount of sodium carbonate, sodium bicarbonate, potassium carbonate, or potassium bicarbonate or a mixture of any two or more of these salts. These salts should preferably be incorporated before the meringue composition is beaten to a foam in order to facilitate uniform distribution of the salts in the meringue. However, they may be incorporated into the meringue preparation at any time before it is baked.

In general, it has been found that the objects of the present invention may be accomplished by employing the salts in an amount between about 0.1% and about 5% and preferably between about 0.1% and 0.75%, by weight of the liquid egg whites. The preferred salt is $NaHCO_3$.

The meringues of the present invention may be baked at a temperature as much as approximately 35° F. below that required in the case of comparable meringues which do not contain the above mentioned carbonate or bicarbonate salts, and/or the baking time of the meringues of the present invention may be reduced by as much as approximately 30 to 40% as compared to the baking time of the prior art meringues. This makes it possible to use foundations which could not be used in conjunction with prior art meringues, thus providing the consumer with a greater variety of meringue desserts.

In order to more clearly disclose the nature of the present invention, specific examples will hereinafter be described. It should be understood, however, that this is done solely by way of example and is intended neither to delineate the scope of the invention nor limit the ambit of the appended claims. In the examples and throughout this specification percentages are intended to refer to percent by weight, unless otherwise specified.

EXAMPLE I

*Preparation of a soft meringue by cold method*

Thirty-four ounces of fresh egg whites were placed in a mixing bowl and while they were whipped, a mixture consisting of forty-eight ounces of cane sugar and ¼ ounce of $NaHCO_3$ (0.75% based on the egg whites) were slowly introduced into the mixing bowl. This mixture was then whipped to a firm dry peak. The resulting meringue was then spread over the surface of lemon pies. The topped pies were placed in an oven, the temperature of which was 450° F. for a period of five minutes, to set the meringue topping. The set meringue topping had a tender texture, a pleasing golden brown surface color, and the pie filling was normal in all respects.

EXAMPLE II

*Preparation of a soft stabilized meringue by hot method*

Thirty-four ounces of frozen egg whites were allowed to thaw and were then slowly whipped while adding slowly, first four ounces of cane sugar and then about 0.4 ounce of $K_2CO_3$ (1.18% based on the egg whites). Whipping was continued to a medium soft peak. A mixture of forty ounces of cane sugar, thirty-two ounces of warm water and two ounces of sodium alginate, was heated to a rolling boil and then slowly added to the egg white mixture. The resulting mixture was beaten to a stiff peak and applied to the surface of a quantity of pies. The topped pies were placed in an oven, the temperature of which was 450° F. for a period of five minutes, to set the meringue topping. The set meringue topping had a tender texture, a pleasing golden brown surface color, and the pie filling was normal in all respects.

EXAMPLE III

*Preparation of a soft meringue from a dry mix by cold method*

A dry mix consisting of 70 grams of sugar, 8.0 grams of dry egg white solids, 0.50 gram of sodium alginate, 0.40 gram of NaCl and 0.5 gram of NaHCO$_3$ (0.75% based on an equivalent weight of undried egg whites) was added to 80 grams of water and the resultant mixture whipped to a stiff peak. This meringue was then applied to pies. The topped pies were placed in an oven, the temperature of which was 450° F. for a period of five minutes, to set the meringue topping. The set meringue topping had a tender texture, a pleasing golden brown surface color, and the pie filling was normal in all respects.

Table I below gives other examples of the desirable effects obtained from the practice of this invention. For purposes of comparison, the results obtained in Examples I, II and III have been included as the last three items in the table. The term "normal" refers to the meringue crust color which is the most desirable.

The terms and expressions which have been employed are used as terms of description and not of limitation, and it is not intended, in the use of such terms and expressions, to exclude any equivalents of the features shown and described or portions thereof, since it is recognized that various modifications are possible within the scope of the invention claimed.

What I claim is:
1. A meringue comprising egg whites, a sugar and an alkali metal salt selected from the group consisting of sodium carbonate, sodium bicarbonate, potassium carbonate and potassium bicarbonate in an amount sufficient to permit browning and setting of the meringue at a given baking temperature in a shorter period of time than that required in the case of a comparable meringue not containing the said salts.
2. A meringue composition as claimed in claim 1, wherein the amount of alkali metal salt is between about 0.1% and about 5.0% based on the weight of the egg whites.
3. A meringue composition as claimed in claim 2, wherein the amount of alkali metal salt is between about 0.1% and about 0.75% based on the weight of the egg whites.

TABLE I

| Type of Soft Meringue Process | Salt Added | Percent Salt Based On Egg Whites | Setting Temp., ° F. | Setting Time, mins. | Meringue Crust Color |
|---|---|---|---|---|---|
| Cold | None | | 450 | 8 | Normal. |
| Hot | do | | 450 | 8 | Do. |
| Cold Stabilized | do | | 440 | 10 | Do. |
| Hot Stabilized | do | | 430 | 10 | Do. |
| Cold | do | | 430 | 6 | Lighter. |
| Hot Stabilized | do | | 410 | 10 | Do. |
| Cold | NaHCO$_3$ | 0.75 | 430 | 7 | Normal. |
| Hot | NaHCO$_3$ | 0.75 | 450 | 5 | Do. |
| Cold Stabilized | NaHCO$_3$ | 0.75 | 410 | 10 | Darker. |
| Hot | Na$_2$CO$_3$ | 0.75 | 420 | 8 | Normal. |
| Hot Stabilized | Na$_2$CO$_3$ | 0.75 | 410 | 6 | Do. |
| Cold Stabilized | KHCO$_3$ | 0.90 | 430 | 7 | Do. |
| Cold | K$_2$CO$_3$ | 0.90 | 450 | 5 | Sl. darker. |
| Hot Stabilized | K$_2$CO$_3$ | 0.90 | 430 | 4½ | Normal. |
| Cold | NaHCO$_3$ | 0.75 | 450 | 5 | Do. |
| Hot Stabilized | K$_2$CO$_3$ | 1.18 | 450 | 5 | Do. |
| Cold Stabilized | NaHCO$_3$ | 0.75 | 450 | 5 | Do. |

References Cited

UNITED STATES PATENTS 1,643,951  10/1927  Leo _____ 99—139
2,485,043  10/1949  Gatti _____ 99—139

A. LOUIS MONACELL, *Primary Examiner.*

RAYMOND N. JONES, *Examiner.*

J. M. HUNTER, *Assistant Examiner.*